US010562390B2

(12) United States Patent
Eulitz et al.

(10) Patent No.: US 10,562,390 B2
(45) Date of Patent: Feb. 18, 2020

(54) OPERATING LIQUID CONTAINER SYSTEM FOR MOTOR VEHICLES WITH IMPROVED MISFUELLING PROTECTION

(71) Applicant: KAUTEX TEXTRON GmbH & Co. KG, Bonn (DE)

(72) Inventors: Dirk Eulitz, Bonn (DE); Hartmut Wolf, Konigswinter (DE); Theodor Ossege, Rheinbreitbach (DE); Klaus Gebert, Willich (DE); Ulrich Karsch, Niederkassel (DE); Christian Erben, Kevelaer (DE)

(73) Assignee: Kautex Textron GmbH & Co., KG, Bonn (DE)

( * ) Notice: Subject to any disclaimer, the term of this patent is extended or adjusted under 35 U.S.C. 154(b) by 0 days.

(21) Appl. No.: 15/754,285

(22) PCT Filed: Jul. 28, 2016

(86) PCT No.: PCT/EP2016/068100
§ 371 (c)(1),
(2) Date: Feb. 21, 2018

(87) PCT Pub. No.: WO2017/045822
PCT Pub. Date: Mar. 23, 2017

(65) Prior Publication Data
US 2018/0281584 A1 Oct. 4, 2018

(30) Foreign Application Priority Data

Sep. 15, 2015 (DE) .......................... 10 2015 217 613

(51) Int. Cl.
*B60K 15/03* (2006.01)
*F01N 3/20* (2006.01)

(52) U.S. Cl.
CPC ............ *B60K 15/03* (2013.01); *F01N 3/2066* (2013.01); *B60K 2015/03203* (2013.01);
(Continued)

(58) Field of Classification Search
CPC .......... B60K 15/03; B60K 2015/03203; B60K 2015/03302; B60K 2015/03361;
(Continued)

(56) References Cited

U.S. PATENT DOCUMENTS 2,148,338 A * 2/1939 Croston ................ B60K 15/05
292/144
3,523,186 A * 8/1970 Cohn .................... G01F 23/288
250/393

(Continued)

FOREIGN PATENT DOCUMENTS

| CN | 103732434 A | 4/2014 |
|---|---|---|
| DE | 2929192 A1 | 9/1981 |

(Continued)

OTHER PUBLICATIONS

International Search Report and Written Opinion dated Sep. 20, 2016 issued in International Application No. PCT/EP2016/068100, filed Jul. 28, 2016.

(Continued)

*Primary Examiner* — Timothy L Maust
*Assistant Examiner* — James R Hakomaki
(74) *Attorney, Agent, or Firm* — Wiley Rein LLP (57) ABSTRACT

The present invention discloses an operating liquid container system comprising at least one operating fluid container, a quality and/or filling level sensor arranged in the operating liquid container, for determining at least one quality characteristic of the operating liquid contained in the operating liquid container and/or a filling level of the operating liquid container, and a display device arranged in a tank recess (Continued)

and/or tank flap of the operating fluid container system, wherein the display device is connected to the quality and/or filling level sensor by means of a data line for transmitting data from the quality and/or filling level sensor to the display device, wherein the data represents at least one quality characteristic of the operating liquid contained in the operating liquid container and/or the filling level of the operating liquid container.

13 Claims, 2 Drawing Sheets

(52) U.S. Cl.
    CPC .............. *B60K 2015/03302* (2013.01); *B60K 2015/03361* (2013.01); *F01N 2610/02* (2013.01); *F01N 2610/142* (2013.01); *F01N 2610/148* (2013.01); *F01N 2610/1493* (2013.01)

(58) Field of Classification Search
    CPC ......... F01N 2610/142; F01N 2610/148; F01N 2610/1493
    USPC .......................................................... 141/83
    See application file for complete search history.

(56) References Cited

U.S. PATENT DOCUMENTS

| | | | | |
|---|---|---|---|---|
| 4,394,925 | A * | 7/1983 | Rump | B60K 15/04 137/587 |
| 5,157,968 | A * | 10/1992 | Zfira | G01F 23/0038 73/149 |
| 5,249,612 | A * | 10/1993 | Parks | B67D 7/348 141/219 |
| 5,562,133 | A * | 10/1996 | Mitchell | B67D 7/54 141/206 |
| 5,770,153 | A * | 6/1998 | Wagner | G01N 7/00 422/79 |
| 5,819,796 | A * | 10/1998 | Kunimitsu | B60K 15/03519 137/587 |
| 6,252,499 | B1 * | 6/2001 | Gerdtz | G01F 23/0076 340/450.2 |
| 6,260,544 | B1 * | 7/2001 | Spry | B60K 15/03504 123/516 |
| 7,251,997 | B1 * | 8/2007 | Casey | F02M 25/08 73/290 R |
| 7,689,371 | B2 * | 3/2010 | Memmott | G05B 15/02 702/55 |
| 8,485,233 | B2 * | 7/2013 | Allinson | B67D 7/0498 141/104 |
| 8,583,387 | B2 * | 11/2013 | Murphy | G01F 23/2962 702/45 |
| 9,770,980 | B2 * | 9/2017 | Dudar | B60K 15/077 |
| 2003/0075156 | A1 * | 4/2003 | Morinaga | F02M 25/0809 123/520 |
| 2003/0209280 | A1 * | 11/2003 | Zerangue, Sr. | B60K 15/04 141/4 |
| 2008/0060433 | A1 | 3/2008 | Coward et al. | |
| 2008/0289399 | A1 * | 11/2008 | Cooper | G01N 33/2888 73/53.01 |
| 2009/0188923 | A1 | 7/2009 | Versaw, Jr. et al. | |
| 2009/0250122 | A1 * | 10/2009 | Menke | F02M 25/08 137/511 |
| 2010/0018309 | A1 * | 1/2010 | Marcovecchio | G01F 23/2962 73/290 V |
| 2011/0209087 | A1 * | 8/2011 | Guyot-Sionnest | G06F 3/0236 715/799 |
| 2013/0014854 | A1 * | 1/2013 | Mori | F17C 5/007 141/1 |
| 2013/0027840 | A1 | 10/2013 | Rothschild | |
| 2013/0278402 | A1 * | 10/2013 | Rothschild | B60Q 1/50 340/425.5 |
| 2014/0196536 | A1 * | 7/2014 | Murphy | G01F 23/296 73/290 V |
| 2014/0202580 | A1 * | 7/2014 | Hutchinson | B67D 7/342 141/1 |
| 2015/0019108 | A1 * | 1/2015 | Hendrickson | F01N 11/00 701/102 |
| 2016/0146159 | A1 * | 5/2016 | Kimoto | F16K 31/04 123/520 |
| 2016/0282168 | A1 * | 9/2016 | Fehrenbach | G01S 7/40 |

FOREIGN PATENT DOCUMENTS

| | | | | |
|---|---|---|---|---|
| DE | 3343432 | A1 | 6/1985 | |
| DE | 3635174 | A1 | 4/1988 | |
| DE | 19833465 | A1 | 2/2000 | |
| DE | 19933512 | A1 | 1/2001 | |
| DE | 19955077 | A1 | 6/2001 | |
| DE | 10020000 | A1 * | 12/2001 | ......... B60K 15/04 |
| DE | 20212980 | U1 | 8/2002 | |
| DE | 202006013601 | U1 * | 1/2008 | ......... B60K 15/0406 |
| DE | 102007056552 | A1 | 5/2009 | |
| DE | 102010007849 | A1 | 9/2010 | |
| DE | 102010020581 | A1 | 11/2011 | |
| DE | 102011114075 | A1 | 6/2012 | |
| DE | 102011108333 | A1 | 1/2013 | |
| DE | 102012001580 | A1 | 8/2013 | |
| DE | 102012009884 | A1 | 11/2013 | |
| DE | 102014006695 | A1 | 11/2014 | |
| DE | 102014206780 | A1 | 10/2015 | |
| EP | 0816284 | A1 | 1/1998 | |
| EP | 1103794 | A2 | 5/2001 | |
| EP | 2093089 | A1 | 8/2009 | |
| EP | 2172630 | A2 | 4/2010 | |
| GB | 2513995 | A * | 11/2014 | ......... G01F 23/0076 |
| KR | 20060058243 | A * | 5/2006 | |
| WO | 2015/075244 | A1 | 5/2015 | |

OTHER PUBLICATIONS

International Preliminary Report on Patentability dated Nov. 30, 2017, in International Application No. PCT/EP2016/068100, filed Jul. 28, 2016.

* cited by examiner

OPERATING LIQUID CONTAINER SYSTEM FOR MOTOR VEHICLES WITH IMPROVED MISFUELLING PROTECTION

RELATED APPLICATIONS

This application is a § 371 National Stage Application of PCT/EP2016/068100, filed Jul. 28, 2016, which claims priority benefit of German Patent Application No. 102015217613.4, filed Sep. 15, 2015, which applications are incorporated entirely by reference herein for all purposes.

FIELD

The present invention concerns an operating liquid container system for motor vehicles. The operating liquid container system may be configured for example as a fuel container system or as a urea container system.

SUMMARY AND DESCRIPTION OF RELATED ART

A motor vehicle (also referred to below as a vehicle) requires various operating liquids for its operation. In vehicles with an internal combustion engine, fuel is carried with the vehicle in an operating liquid container of the vehicle formed as a fuel container. The fuel may be petrol, diesel or ethanol. Furthermore, in vehicles with internal combustion engines, in particular diesel engines, a watery urea solution is injected into the exhaust gas train to reduce nitrogen oxides in the exhaust gas of the vehicle. To this end, the vehicle has a urea container to store the watery urea solution.

For operation of an internal combustion engine, the fuel must possess certain properties. A diesel engine requires diesel fuel, whereas a petrol engine requires petrol fuel. Furthermore, different petrol engines may require different petrol fuels with different octane numbers and/or with different ethanol contents. It must be taken into account that the vapor pressure of the fuels is temperature-dependent. Different diesel engines, however, may for example require different diesel fuels with different sulfur contents and/or different cetane numbers.

EP 0816284 A1 describes an apparatus for checking a quantity of fuel, diesel or other liquids introduced via a filler neck. The apparatus can be inserted in a filler neck so that a filler device, for example in the form of a delivery valve, can be introduced into this apparatus. The apparatus is configured to determine the delivered quantity by means of a flow detector. Furthermore, the apparatus is configured to determine the electrical conductivity of the delivered liquid by means of electrode pairs, in order to perform a differentiation between a petrol fuel and a diesel fuel.

An operating liquid container is normally filled with an operating liquid by means of a filler apparatus in the form of a pump dispenser. When filling the operating liquid container, for operating liquid containers known from the prior art, the driver or filler must rely on the data from the filler apparatus with regard to the quantity and composition or quality of the operating liquid delivered. This can lead to a deterioration in performance and, if for example petrol fuel is introduced into a diesel fuel container, even damage to the internal combustion engine. Furthermore, there is a risk that the filler apparatus may deliver less operating liquid, or operating liquid of lower quality, into the operating liquid container than indicated by the filler apparatus, so that the driver or filler pays too high a price for the operating liquid introduced.

SUMMARY OF THE INVENTION

The present invention is based on the object of providing an operating liquid container system for a motor vehicle which increases the operating reliability of the vehicle and offers the driver improved protection against the possibility of fraud.

The object forming the basis of the present invention is achieved by an operating liquid container system with the features of claim 1. Advantageous embodiments are described in the dependent claims.

More precisely, the object on which the present invention is based is achieved by an operating liquid container system comprising at least one operating liquid container, wherein a quality and/or fill level sensor is arranged in the operating liquid container for determining at least one quality property of the operating liquid contained in the operating liquid container and/or a fill level of the operating liquid container. The operating liquid container system according to the invention furthermore comprises a display device which is arranged in a tank recess and/or tank flap of the operating liquid container system. Here, the display device is connected to the quality and/or fill level sensor by means of a data line for transmitting data from the quality and/or fill level sensor to the display device, wherein the data represent at least one quality property of the operating liquid contained in the operating liquid container and/or the fill level of the operating liquid container. The display device is designed to display the data representing the at least one quality property and/or the fill level.

By means of the quality and/or fill level sensor, at least one quality property of the operating liquid and/or the fill level of the operating liquid container can be determined. The data thus determined are displayed to the driver or filler so as to be clearly visible on the display device in the region of the tank recess and/or the inside of the tank flap. Thus it is possible for the filler to determine whether the operating liquid properties are sufficient for his vehicle. Furthermore, the filler can establish whether for example the correct fuel is being delivered. In the case that an incorrect fuel type is introduced into the fuel container, the driver is informed via the display device so that the filler/driver does not attempt to start the vehicle, thus avoiding damage to the internal combustion engine. Furthermore, the filler/driver can establish whether the quantity of operating liquid delivered, as indicated by the filler apparatus (e.g. a pump system), corresponds to the quantity of operating liquid actually introduced into the operating liquid container.

The quality property of the operating liquid is for example its ethanol content, its octane number, its cetane number, its water content, its cloudiness, its peroxide content, its vapor pressure, its sulfur content, its biodiesel content, its urea content etc. Consequently, the quality and/or fill level sensor is configured to determine the ethanol content and/or the octane number and/or the cetane number and/or the water content and/or the cloudiness and/or the peroxide content and/or the vapor pressure and/or the sulfur content and/or the biodiesel content and/or the urea content of the operating liquid in the operating liquid container.

The quality and/or fill level sensor may also be called an operating liquid quality and/or fill level sensor, or an operating liquid quality and/or operating liquid fill level sensor. The quality and/or fill level sensor is designed to determine quality properties of the operating liquid and/or the quantity of operating liquid present in the operating liquid container. The quality and/or fill level sensor may be configured as a quality sensor. Furthermore, the quality and/or fill level sensor may be configured as a fill level sensor. Moreover, the quality and/or fill level sensor may be divided into two and comprise a quality sensor and a separate fill level sensor. The operating liquid container system may also comprise several operating liquid containers, for example a fuel tank, a urea container and a water container.

Preferably, the operating liquid container system comprises a fill control device which is connected to the quality and/or fill level sensor for receiving the data representing the at least one quality property and/or the fill level by means of the data line. The fill control device is connected to the display device by means of the data line for transmission of the data representing the at least one quality property and/or the fill level.

A correspondingly configured operating liquid container system offers the advantage that the data determined by the quality and/or fill level sensor can be processed further by the fill control device. For example, comparisons with reference values for the quality properties can be made in the fill control device.

Preferably, the fill control device is configured to receive, in addition to the data transmitted by the quality and/or fill level sensor, also data representing a tilt of the motor vehicle tank. Furthermore, the fill control device is configured to determine an actual fill level by means of the data transmitted from the quality and/or fill level sensor and the data representing the tilt of the motor vehicle tank.

The actual fill level corresponds to the fill level of the operating liquid container (i.e. the nominal fill level of the operating liquid container) when the operating liquid container is not tilted, i.e. when the vehicle is positioned on a plane without incline. The connection between the fill level sensor signal, the data representing the tilt of the operating liquid container, and the actual fill level of the operating fluid container (actual fill level) is preferably stored in a correction map which is preferably stored in the fill control device.

The physical position of the motor vehicle or operating liquid container is measured preferably by a position sensor specific to the vehicle. To produce the correction map, the operating liquid container may be tilted for example in 5° steps about a horizontal axis, and the operating liquid container may be rotated in 5° steps through 360° in every oblique position about the vertical axis. In each of these oblique positions and rotational points, a height-volume curve is produced and entered in the correction map. The correction map then serves to determine the precise quantity of operating liquid present in the operating liquid container. Furthermore, the correction map may take into account temperature variations of the fuel.

A correspondingly formed operating liquid container offers the advantage that the actual fill level of the operating liquid container can be determined again with increased accuracy, so as to achieve an increased certainty of reaching a predefined destination, wherein at the same time it is guaranteed that the operating liquid container does not contain too much fuel, thus reducing the weight of the motor vehicle and hence its carbon dioxide emissions. Furthermore, aging of the operating liquid is countered by carrying only the required quantity of operating liquid.

Preferably, the operating liquid container comprises a tilt sensor, by means of which the tilt of the operating liquid container can be determined. Here, the tilt sensor is connected to the fill control device via the second data exchange connection, and/or via a further data exchange connection which may be implemented via a further signal line, via which the data determined by the tilt sensor and representing the tilt of the operating liquid container can be transmitted to the fill control device.

Preferably, the fill control device is configured to output a warning signal via a data output unit when a quality property of the operating liquid present in the operating liquid container is determined which lies below and/or above a predefined threshold limit.

The fill control device contains, in an electronic memory, quality limit values for the ethanol content and/or the octane number and/or the cetane number and/or the water content and/or the cloudiness and/or the peroxide content and/or the vapor pressure and/or the sulfur content and/or the biodiesel content and/or the urea content. The data provided by the quality and/or fill level sensor and the data representing the above-mentioned quality properties are compared with the quality limit values in the fill control device, wherein the warning signal is output by the fill control device if one of the quality properties of the operating liquid lies below and/or above at least one quality limit value.

Preferably, the fill control device is configured to transmit the warning signal via the data line to the display device, whereupon the display device outputs the warning signal.

The correspondingly configured operating liquid container system offers the advantage that the warning signal is visible to the driver/filler directly during the process of filling the operating liquid container, since the warning signal is displayed in the region of the tank recess and/or the tank flap. As soon as the warning signal is visible to the driver/filler, the driver/filler may terminate the process of filling the operating fluid container immediately so as to minimize or even prevent damage to the motor vehicle.

The warning signal may evidently also be sent e.g. to engine control electronics of the vehicle, so that the engine cannot be started if the fuel is of the incorrect quality or incorrect type (e.g. diesel instead of petrol).

Furthermore preferably, the operating liquid container is configured so that it comprises at least one actuator which can be actuated electrically and/or electromagnetically, and by means of which the termination of a filling process of the operating liquid container can be initiated. Here, the fill control device is connected to the actuator via a data exchange connection, and furthermore configured to transmit a stop filling signal to the actuator via the data exchange connection if the warning signal is given. On receipt of the stop filling signal, the actuator initiates the termination of the filling process.

The stop filling signal is also known as a stop fueling signal, and the start filling signal as a start fueling signal.

A correspondingly configured operating liquid container offers the advantage that a filling process can be ended automatically by the operating liquid container system if the fill control device establishes that, for example, a fuel delivered does not correspond to the fuel type of the internal combustion engine of the vehicle, or if for example the quality of the operating liquid does not correspond to the required quality. Automatic termination of the filling process thus increases the operating reliability of the vehicle and warranty costs can be reduced.

The operating liquid container is preferably configured such that the at least one actuator is configured as an operating and/or filling purge valve which is arranged in the motor vehicle tank. Here, the operating and/or filling purge valve can be actuated/moved electrically and/or electromagnetically between an open position and a closed position, wherein in the open position of the operating and/or filling purge valve, the operating liquid container is fluidically connected to a purge line by means of the operating and/or filling purge valve, and wherein in the closed position of the operating and/or filling purge valve, the operating liquid container is fluidically separated from the purge line by means of the operating and/or filling purge valve.

The use of the operating and/or filling purge valve to terminate a filling process offers the advantage that valve devices necessary for operation of the operating liquid container can be used to terminate the filling process electrically and/or electromagnetically, so that no further components need be installed in the operating liquid container, thus avoiding increasing the complexity of the correspondingly formed operating liquid container.

The operating liquid container is preferably furthermore configured such that the at least one actuator is configured as a check valve which is arranged in a filler pipe opening into the operating liquid container. Here, the check valve can be actuated/moved electrically and/or electromagnetically between an open position and a closed position, wherein in the open position of the check valve, the operating liquid container is fluidically connected to the filler pipe, and wherein in the closed position of the check valve, the operating liquid container is fluidically separated from the filler pipe by means of the check valve, or the internal width of the filler pipe is reduced by means of the check valve.

Furthermore preferably, the operating liquid container is configured such that the at least one actuator is configured as an interference body which is arranged in a filler pipe opening into the operating liquid container, wherein the interference body can be actuated electrically and/or electromagnetically between an open position and an interference position, wherein in the open position of the interference body, an internal width of the filler pipe is not reduced, and wherein in the interference position of the interference body, this protrudes into the filler pipe and reduces the internal width of the filler pipe.

Furthermore preferably, the operating liquid container is configured such that the at least one actuator is configured as an electromagnet which is arranged in a filler neck of a filler pipe opening into the operating liquid container, wherein the electromagnet can be actuated/moved between an active state and a passive state. Activating the electromagnet causes closure of a delivery valve inserted in the filler pipe, or activating the electromagnet causes an opening of a delivery valve.

The last three embodiments of the operating liquid container described offer the advantage that, to end the filling process, it is not necessary to build up an internal pressure in the operating liquid container, so that after termination of the filling process, the operating liquid container is substantially pressureless. Since no internal pressure has been built up, the operating liquid container does not expand, so the accuracy of the fill quantity determination in the operating liquid container is increased. Furthermore, the fact that no pressure need be built up in the operating liquid container to end the filling process offers the advantage that the quantity of operating liquid delivered into the operating liquid container corresponds more precisely to the quantity of operating liquid to be introduced into the operating liquid container. This is because the gas volume remaining in the operating liquid container does not function as a compressible gas spring. The quantity of operating liquid delivered into the filler pipe can be determined very precisely, so that the accuracy of the operating liquid quantity introduced is increased.

In a further preferred embodiment, the operating liquid container is configured such that the at least one actuator is configured as a shut-off valve which is arranged between the operating liquid container and an activated carbon filter and/or between an activated carbon filter and the atmosphere. The shut-off valve can be actuated/moved electrically and/or electromagnetically between an open position and a closed position, wherein in the open position of the shut-off valve, the operating liquid container is fluidically connected to the activated carbon filter or the atmosphere by means of the shut-off valve, and wherein in the closed position of the shut-off valve, the operating liquid container is fluidically separated from the activated carbon filter or the atmosphere by means of the shut-off valve.

Furthermore preferably, the operating liquid container system is configured such that the fill control device has a signal transmitter unit for wireless transmission of signals to a filler apparatus.

Thus by means of the fill control device, for example an operating liquid to be introduced into the operating liquid container can be specified, so that the filler apparatus provides only the corresponding operating liquid. Misfueling is thus reliably avoided. Furthermore, by means of the fill control device, a stop filling signal can be sent to the filler apparatus so the filling of the operating liquid container is terminated by the filler apparatus. If for example the fill control device establishes that the incorrect operating liquid, or an operating liquid of unsuitable quality, is introduced into the operating liquid container, the fill control device can send the stop filling signal to the filler apparatus, whereupon the filling process is terminated immediately. A corresponding configuration of the operating liquid container system ensures that, if delivery of an unsuitable operating liquid is established, very little of the unsuitable operating liquid is introduced into the operating liquid container.

BRIEF DESCRIPTION OF THE DRAWINGS

Further advantages, details and features of the invention arise from the exemplary embodiment explained below. The drawing shows in detail.

DETAILED DESCRIPTION OF THE EMBODIMENTS

In the description below, the same reference signs designate the same components or the same features, so that the description of a component given in relation to one figure also applies to the other figures, thus avoiding repeated description.

Figure 1:
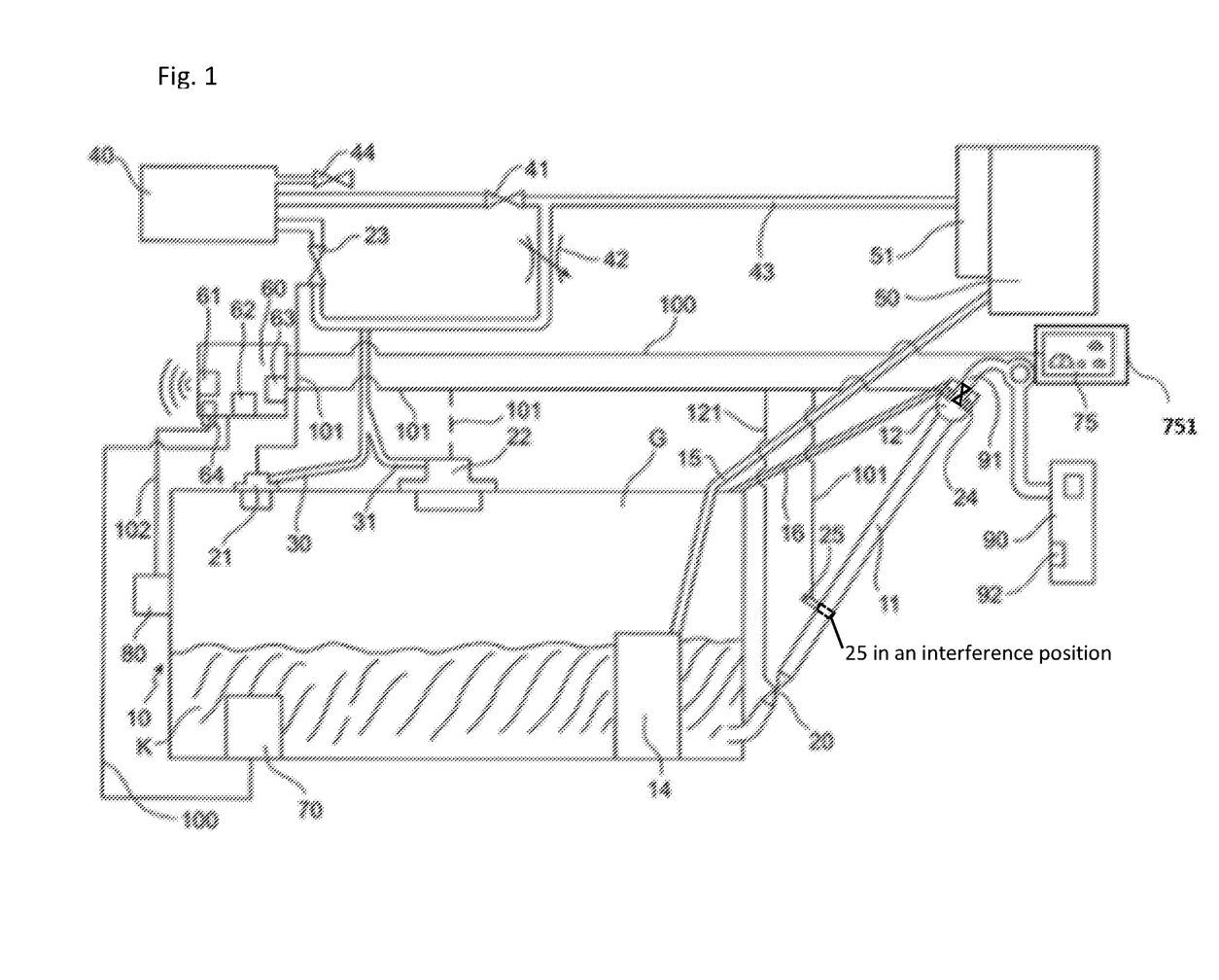
FIG. 1: a diagrammatic depiction of an operating liquid container system according to the invention.

FIG. 1 shows an operating liquid container system according to the invention, in which the operating liquid container 10 is configured as a motor vehicle tank 10. This configuration of the present invention is purely exemplary. The operating liquid container system according to the invention may evidently also comprise, instead of the motor vehicle tank 10 or in addition to the motor vehicle tank 10, an operating liquid container 10 configured as a urea container 10. Furthermore, the operating liquid container system according to the invention may evidently comprise, instead of the motor vehicle tank 10 or in addition to the motor vehicle tank 10, an operating liquid container 10 configured as a water container/screen wash container 10.

The motor vehicle tank 10 accommodates a specific quantity of fuel K, and in addition a gas volume G which is normally saturated with hydrocarbons. For filling with fuel K, the motor vehicle tank 10 has a filler pipe 11, on the end of which facing away from the fuel tank 10 a filler neck 12 is arranged. Furthermore, the motor vehicle tank 10 accommodates a fuel pump 14. The fuel pump 14 is fluidically connected via a fuel line 15 to an engine 50 of a motor vehicle (not shown in the figure) for the delivery of fuel K to the engine 50. Furthermore, the motor vehicle tank 10 may comprise a recirculation line 16 which is fluidically connected to the motor vehicle tank 10 and to a volume enclosed by the filler neck 12. The recirculation line 16 serves for gas exchange between the motor vehicle tank 10 and the filler neck 12 during a fueling process of the motor vehicle tank 10, and is provided purely optionally and normally for the US American market.

The operating liquid container 10 formed as a motor vehicle tank 10 comprises a quality and/or fill level sensor 70 arranged therein for determining at least one quality property of the fuel contained in the motor vehicle tank 10 and/or a fill level of the motor vehicle tank 10. Furthermore, the operating liquid container system comprises a display device 75 which is arranged in a tank recess and/or a tank flap of the operating liquid container system. The display device 75 is preferably arranged on the inside of the tank flap. The display device 75 is depicted alone in FIG. 2. It is evident that the display device 75 comprises several display elements, via which for example the fill level of the motor vehicle tank 10 can be read. The display device 75 furthermore comprises further display elements which indicate the fill level of a screen wash container and a urea container, wherein the operating liquid container system depicted in FIG. 1 shows neither the urea container nor the screen wash container. The display device 75 furthermore has a display element via which a warning signal can be depicted.

The display device 75 is connected to the quality and/or fill level sensor 70 by means of a data line 100 for transmission of data from the quality and/or fill level sensor 70 to the display device 70, wherein the data represent at least one quality property of the fuel contained in the motor vehicle tank 10 and/or the fill level of the motor vehicle tank 10. The display device 75 is configured to depict the data representing the at least one quality property and/or the fill level. The fill control device 60 is connected to the quality and/or fill level sensor 70 for receiving the data representing the at least one quality property and/or the fill level by means of the data line 100. Furthermore, the fill control device 60 is connected to the display device 75 by means of the data line 100 for transmission of the data representing the at least one quality property and/or the fill level.

A quality property of the operating liquid here is for example its ethanol content, its octane number, its cetane number, its water content, its cloudiness, its peroxide content, its vapor pressure, its sulfur content, its biodiesel content, its urea content etc. Consequently, the quality and/or fill level sensor 70 is configured to determine the ethanol content and/or the octane number and/or the cetane number and/or the water content and/or the cloudiness and/or the peroxide content and/or the vapor pressure and/or the sulfur content and/or the biodiesel content and/or the urea content of the operating liquid in the operating liquid container.

By means of the quality and/or fill level sensor 70, at least one quality property of the operating liquid and/or the fill level of the operating liquid container 10 can be determined. The data thus determined are displayed on the display device 75 so as to be clearly visible to the driver or filler in the region of the tank recess and/or the inside of the tank flap. Thus it is possible for the filler to establish whether the operating liquid properties are sufficient for his vehicle. Furthermore, the filler can establish whether for example the correct fuel has been delivered. In the case that an incorrect fuel type is delivered into the fuel container, the driver is informed via the display device 75 so that the filler/driver does not make any attempt to start the vehicle, thus avoiding damage to the internal combustion engine 50. Furthermore, the filler/driver can establish whether the operating liquid quantity delivered as indicated by the filler apparatus 90 (e.g. a pump system) corresponds to the actual quantity of operating liquid introduced into the operating liquid container 10.

Furthermore, FIG. 1 shows that the fill control device 60 comprises a data output unit 63, via which data and/or signals can be transmitted via a first data exchange connection 101 to actuators 20, 21, 22, 23, 24, 25, 44 which can be actuated electrically and/or electromagnetically. The first data exchange connection 101 may also be designated the first signal line 101 or in general the first electrical line 101. The actuators 20-25, 44 to be specified further below are configured to initiate a termination of a filling process of the motor vehicle tank 10. For this, the tank control device 60 is configured to transmit a stop filling signal via the data exchange connection 101 to one or more of the actuators 20-25, 44 so that, on receipt of the stop filling signal, at least one of the actuators 20-25, 44 initiates, in a manner to be specified further below, a termination of the filling process.

In FIG. 1, the motor vehicle tank 10 is depicted with actuators 20-25, 44. However, the present invention should not be understood to mean that all actuators 20-25, 44 are necessary to initiate a termination of a filling process of the motor vehicle tank 10. Rather, a termination of a filling process of the motor vehicle tank 10 may be initiated by just a single actuator 20-25, 44 which can be actuated electrically and/or electromagnetically. Consequently, the present invention should be understood to mean that the motor vehicle tank 10 according to the invention may have just a single actuator 20-25, 44 which can be actuated electrically and/or electromagnetically. Therefore FIG. 1 should be understood to mean that the motor vehicle tank 10 comprises at least one of the actuators 20-25 which can be actuated electrically and/or electromagnetically. However, the motor vehicle tank 10 may also comprise several actuators 20-25, 44 which can be actuated electrically and/or electromagnetically.

The actuator 22 which can be actuated electrically and/or electromagnetically is configured as a filling purge valve 22 which is arranged in the motor vehicle tank 10. The operating purge valve 21 is closed during filling. On receipt of a stop filling signal, which is output by the fill control device 60 via the data output unit 63 to the filling purge valve 22, said valve closes to suppress purging of the motor vehicle tank 10 during the filling process. On further introduction of fuel via the filler pipe 11 into the motor vehicle tank 10, the tank internal pressure rises so that the fuel introduced into the filler pipe 11 rises in the filler pipe 11 until the fuel reaches a shut-off bore of an inserted delivery valve, whereby the filling process is ended.

The filling purge valve 22 can be actuated/moved electrically and/or electromagnetically between an open position and a closed position, wherein in its open position the motor vehicle tank 10 is fluidically connected to the atmosphere via the filling purge valve 22, and wherein in the closed position of the filling purge valve 22, the motor vehicle tank 10 is fluidically separated from the atmosphere.

FIG. 1 shows that the fluidic connection of the motor vehicle tank 10 to the atmosphere takes place via an activated carbon filter 40 and an outlet valve 41 or a diagnosis valve 44; however, the activated carbon filter 40 is not compulsory but optional for the present invention.

The operating liquid container system shown in FIG. 1 has an activated carbon filter 40 which is fluidically connected via a shut-off valve 23 to the operating purge valve 21 and to the filling purge valve 22 and hence to the motor vehicle tank 10. The operating purge valve 21 and the filling purge valve 22 need not necessarily be actuatable electrically and/or electromagnetically, but only the shut-off valve 23 must be actuatable electrically and/or electromagnetically. However, evidently, it is also possible that the operating purge valve 21 and the filling purge valve 22, as well as the shut-off valve 23, can be actuated electrically and/or electromagnetically.

The shut-off valve 23 is arranged between the motor vehicle tank 10 and the activated carbon filter 40, and can be actuated/moved electrically and/or electromagnetically between an open position and a closed position, wherein in the open position of the shut-off valve 23, the motor vehicle tank 10 is fluidically connected to the activated carbon filter 40 by means of the shut-off valve 23, and wherein in the closed position of the shut-off valve 23, the motor vehicle tank 10 is fluidically separated from the activated carbon filter 40 by means of the shut-off valve 23. On receipt of a stop filling signal transmitted by the data output unit 63 of the fill control device 60 to the shut-off valve 23 via the first data exchange connection 101, the shut-off valve 23 closes so that purging of the fuel container 10 during the filling process is suppressed, so that when fuel is introduced via the filler pipe 11 into the motor vehicle tank 10, its internal pressure rises. On further introduction of fuel into the filler pipe 11, the fuel rises in the filler pipe 11 until it reaches a shut-off bore of a delivery valve (not shown in the figure), whereupon the filling process is ended.

The actuator 20 is configured as a check valve 20 which is arranged in the filler pipe 11. The check valve 20 can be actuated electrically and/or electromagnetically between an open position and a closed position, wherein in the open position of the check valve 20, the motor vehicle tank 10 is fluidically connected to the filler pipe 11, and wherein in the closed position of the check valve 20, the motor vehicle tank 10 is fluidically separated from the filler pipe 11 by means of the check valve 20, or at least the internal width of the filler pipe 11 is reduced by means of the check valve 20.

On receipt of a stop filling signal sent by the data output unit 63 of the fill control device 60 to the check valve 20 via the first data exchange connection 101, the check valve 20 is transferred to its closed position, whereupon fuel introduced into the filler pipe 11 can no longer—or only slowly—be conducted into the fuel tank 10. On further introduction of fuel into the filler pipe 11, the fuel rises in the filler pipe 11 until it reaches a shut-off bore of a delivery valve (not shown in the figure), whereupon the filling process is ended.

A correspondingly configured motor vehicle tank 10 offers the advantage that, to end the filling process, no pressure need be built up inside the motor vehicle tank 10, so that after termination of the filling process, the fuel tank 10 is substantially pressureless. In this way, the load on any activated carbon filter 40 present is reduced. In addition, a fuel quantity in the motor vehicle tank 10 can be determined with increased accuracy since, because there is no pressurization of the motor vehicle tank 10, there is no or only a reduced deformation of the motor vehicle tank 10.

The actuator 25 is configured as an interference body 25 which is arranged in the filler pipe 11. The interference body 25 can be actuated/moved electrically and/or electromagnetically between an open position and an interference position, wherein in the open position of the interference body 25, the internal width of the filler pipe 11 is not reduced, and wherein in the interference position of the interference body 25, this protrudes into the filler pipe 11 and hence reduces the internal width of the filler pipe 11.

On receipt of a stop filling signal sent by the data output unit 63 of the fill control device 60 to the interference body 25 via the first data exchange connection 101, the interference body 25 is transferred into its closed position, whereupon fuel introduced into the filler pipe 11 can no longer—or only with reduced speed—be conducted into the fuel tank 10. The interference body 25 causes an eddying of the fuel introduced, whereupon a shut-off opening of the delivery valve 91 comes into contact with the eddying fuel, causing a shut-off by the delivery valve 91. On further introduction of fuel into the filler pipe 11, the fuel rises in the filler pipe 11 until it reaches a shut-off bore of a delivery valve (not shown in the figure), whereupon the filling process is ended.

A correspondingly configured motor vehicle tank 10 offers the advantage that, to end the filling process, no pressure need be built up inside the motor vehicle tank 10, so that after termination of the filling process, the motor vehicle tank 10 is substantially pressureless. In this way, the load on any activated carbon filter 40 present is reduced. In addition, a fuel quantity in the motor vehicle tank 10 can be determined with increased accuracy since, because there is no pressurization of the motor vehicle tank 10, there is no or only a reduced deformation of the motor vehicle tank 10.

Furthermore, the at least one actuator 24 may be configured as an electromagnet 24 which is arranged in the filler neck 12. The electromagnet 24 may in particular be formed as a ring magnet 24. The electromagnet 24 can be actuated between an active state and a passive state, wherein in the active state, the electromagnet 24 produces a magnetic field, and wherein in the passive state, the electromagnet 24 does not produce a magnetic field.

By transmission of a stop filling signal from the data exchange unit 63 of the fill control device 60 to the electromagnet 24, this is transferred to its passive state so that no magnetic field is produced, and consequently a delivery valve 91 introduced into the filler neck 12 is closed. A correspondingly configured motor vehicle tank 10 offers the advantage that, to end a filling process, no pressure need be built up inside the motor vehicle tank 10, so that an optionally provided activated carbon filter 40 is less heavily loaded, and in addition, there is no deformation of the motor vehicle tank 10 by pressurization, allowing an increased accuracy in determining a fill level of the motor vehicle tank 10. In addition, the motor vehicle tank 10 according to the fifth embodiment offers the advantage that, to end the filling process, the filler pipe 11 need not be filled with fuel at all, so that a far more specific stop filling signal can be achieved.

It is evident from FIG. 1 that the motor vehicle tank 10 furthermore comprises a tilt sensor 80 for determining a tilt of the motor vehicle tank 10. The tilt sensor 80 is connected to the fill control device 60 via a second data exchange connection 102 in the form of a second data line 102, wherein the third data line 102 is connected to a second receiving unit 64 of the fill control device 60. The tilt sensor 80 is configured to transmit data it has determined, representing the tilt of the motor vehicle tank 10, to the fill control device 60.

The fill control device 60 is here configured to receive, in addition to the data transmitted by the quality and/or fill level sensor 70, the data transmitted by the tilt sensor 80, and to determine an actual fill level of the motor vehicle tank 10 taking into account the data from the quality and/or fill level sensor 70 and from the tilt sensor 80. Thus it is possible to determine the fill level of the motor vehicle tank 10 even more precisely, since an inclined position of the motor vehicle and hence of the motor vehicle tank 10 can be taken into account.

The motor vehicle tank 10 need not necessarily comprise a tilt sensor 80 for taking into account a spatial position or tilt of the motor vehicle tank 10, since normally a tilt sensor is present in the on-board electronics of a motor vehicle, data from which can be transmitted to the second data receiving unit 64 of the tank control device 60.

In the motor vehicle tank 10 shown in FIG. 1, the activated carbon filter 40 is fluidically connected to an intake tract 51 of the engine 50 via an outlet valve 41 and a flushing line 43. Thus the activated carbon filter 40 can be flushed with intake air of the engine 50. Furthermore, it is clear from FIG. 1 that the operating purge line 30 and the filling purge line 31 are fluidically connected to the intake tract 51 of the engine 50 via a throttle valve 42. Thus it is possible to conduct pressurized gas from the fuel container 10 directly to the intake tract 51, via the throttle valve 42 and the flushing line 43, so that the gas saturated with hydrocarbons can be used directly for combustion inside the engine 50.

It is furthermore evident from FIG. 1 that the fill control device 60 has a signal transmitter unit 61 for wireless transmission of signals to a filler apparatus 90. Thus it is possible for the fill control device 60 to send the filler apparatus 90 a stop filling signal via the signal transmitter unit 61, whereupon the filler apparatus 90 ceases to deliver the operating liquid to the operating liquid container 10. Furthermore, it is also possible that the fill control device 60 sends a value to the filler apparatus 90 for a quantity of operating fluid to be introduced, whereupon the filler apparatus 90 automatically delivers the required quantity of operating liquid to the operating liquid container 10. Also, the transmission of data from the tank control device 60 to the filler apparatus 90 allows the tank control device 60 to tell the filler apparatus 90 the nature of the operating liquid to be introduced, whereupon the filler apparatus selects the operating liquid to be introduced. This is particularly advantageous if the filler apparatus 90 has only a single delivery valve 91, via which for example fuel types of different quality (e.g. different octane numbers) can be delivered.

Figure 2:
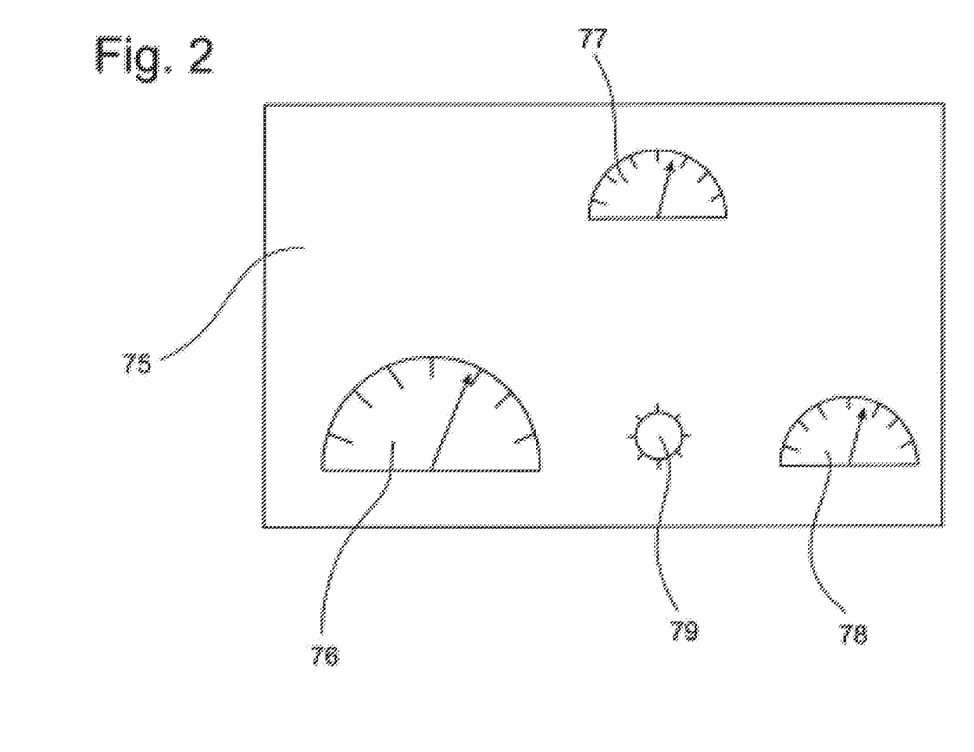
FIG. 2: a diagrammatic depiction of a display device of the operating liquid container system.

FIG. 2 depicts diagrammatically a display device 75 of the operating liquid container system according to the invention. The display device 75 comprises here a display element 76 for displaying the fuel quantity contained in a fuel container 10. Furthermore, the display device 75 has a display element 77 for displaying the screen wash quantity contained in a water container. Furthermore, the display device 75 has a display element 78 for displaying a urea solution quantity contained in a urea container. In addition, the display device 75 also has a warning signal display 79, by means of which a warning signal can be depicted visually.

In the display device 75 shown in FIG. 2, the display elements 76-79 are configured as analog display instruments. However, the respective display elements could also be configured in the form e.g. of light strips. Furthermore, the display device could be configured as an LCD/TFT display device 75. Thus there are no restrictions with regard to the display device of 70.

Furthermore, by means of the display device 75, the respective quality properties of the operating liquid contained in the operating liquid container 10 can be depicted.

LIST OF REFERENCE SIGNS

10 Operating liquid container/motor vehicle tank
11 Filler pipe (of operating liquid container/motor vehicle tank)
12 Filler neck
14 Operating liquid delivery device/fuel delivery device/fuel pump
15 Operating liquid line/fuel line
16 Recirculation line
20 Actuator/check valve
21 Actuator/operating purge valve
22 Actuator/filling purge valve
23 Actuator/shut-off valve/FTIV (fuel tank isolation valve)
24 Actuator/electromagnet (inside filler neck)
25 Actuator/interference body (inside filler neck)
30 Operating purge line
31 Filling purge line
40 Activated carbon filter
41 Outlet valve/purge valve
42 Throttle valve
43 Flushing line
44 Diagnostic valve/OBD valve (on-board diagnostic valve)
50 Engine
51 Intake tract (of engine)
60 Fill control device/fill controller (of operating liquid container/motor vehicle tank)
61 Data transmission unit (of fill control device)
62 Data receiving unit (of fill control device)
63 Data output unit
64 (Second) data receiving unit (of fill control device)
70 Quality and/or fill level sensor
75 Display device
76 Display element for fuel container
77 Display element for SCR container
78 Display element for water container
79 Display element for warning signal
80 Tilt sensor
90 Filler apparatus/pump system
91 Delivery valve
92 Data receiving device (of filler apparatus)
100 Data line
101 (First) data exchange connection/signal line/electrical line
102 (Second) data exchange connection/signal line/electrical line
G Gas volume (in operating liquid container/motor vehicle tank)
K Operating liquid/fuel (in operating liquid container/motor vehicle tank)

The invention claimed is:
1. An operating liquid container system comprising
at least one operating liquid container (10);
a quality and fill level sensor (70) arranged in the operating liquid container (10) for determining at least one quality property of operating liquid contained in the operating liquid container (10) and a fill level of operating liquid contained in the operating liquid container (10); and a display device (75) arranged in a tank recess (751) and/or tank flap (751) of the operating liquid container system; and a fill control device (60) configured to output a warning signal via a data output unit when a quality property of the operating liquid present in the operating liquid container (10) is determined which lies below and/or above a predefined threshold limit;

wherein the display device (75) is connected to the quality and fill level sensor (70) by means of a data line (100) for transmitting data from the quality and fill level sensor (70) to the display device (75), wherein the data represent at least one quality property of the operating liquid contained in the operating liquid container (10) and the fill level of operating liquid contained in the operating liquid container (10);

the display device (75) is designed to display the data representing the at least one quality property and the fill level.

2. The operating liquid container system as claimed in claim 1, wherein the fill control device (60) is connected to the quality and fill level sensor (70) for receiving the data representing the at least one quality property and the fill level by means of the data line (100); and the fill control device (60) is connected to the display device (75) by means of the data line (100) for transmission of the data representing the at least one quality property and the fill level.

3. The operating liquid container system as claimed in claim 2, wherein the fill control device (60) is configured to receive, in addition to the data transmitted by the quality and fill level sensor (70), also data representing a tilt of the operating liquid container (10); and the fill control device (60) is configured to determine an actual fill level by means of the data transmitted from the quality and fill level sensor (70) and the data representing the tilt of the operating liquid container (10).

4. The operating liquid container system as claimed in claim 3, wherein the operating liquid container (10) comprises a tilt sensor (80), by means of which the tilt of the operating liquid container (10) is determined, wherein the tilt sensor (80) is connected to the fill control device (60) via a second data exchange connection (102), via which data determined by the tilt sensor (80) and representing the tilt of the operating liquid container (10) is transmitted to the fill control device (60).

5. The operating liquid container system as claimed in claim 1, wherein the fill control device (60) is configured to transmit the warning signal via the data line (100) to the display device (75), whereupon the display device (75) outputs the warning signal.

6. The operating liquid container system as claimed in claim 1, wherein the operating liquid container (10) comprises at least one actuator (20, 21, 22, 23, 24, 25, 44) which is actuated electrically and/or electromagnetically, and by means of which termination of a filling process of the operating liquid container (10) is initiated;

the fill control device (60) is connected to each actuator (20, 21, 22, 23, 24, 25, 44) via a data exchange connection (101);

the fill control device (60) is configured to transmit a stop filling signal to each actuator (20, 21, 22, 23, 24, 25, 44) via the data exchange connection (101) when the warning signal is output; and on receipt of the stop filling signal, each actuator (20, 21, 22, 23, 24, 25, 44) initiates the termination of the filling process.

7. The operating liquid container system as claimed in claim 6, wherein the at least one actuator (21, 22) is configured as an operating and/or filling purge valve (21, 22) arranged in the operating liquid container (10), wherein the operating and/or filling purge valve (21, 22) is actuated electrically and/or electromagnetically between an open position and a closed position;

the operating liquid container (10) is fluidically connected to a purge line (30, 31) by means of the operating and/or filling purge valve (21, 22) in the open position; and the operating liquid container (10) is fluidically separated from the purge line (30, 31) by means of the operating and/or filling purge valve (21, 22) in the closed position.

8. The operating liquid container system as claimed in claim 6, wherein the at least one actuator (20) is configured as a check valve (20) arranged in a filler pipe (11) opening into the operating liquid container (10);

the check valve (20) is actuated electrically and/or electromagnetically between an open position and a closed position;

the operating liquid container (10) is fluidically connected to the filler pipe (11), by means of the check valve (20) in the open position; and the operating liquid container (10) is fluidically separated from the filler pipe (11) by means of the check valve (20) in the closed position, or the internal width of the filler pipe (11) is reduced by means of the check valve (20) in the closed position.

9. The operating liquid container system as claimed in claim 6, wherein the at least one actuator (25) is configured as an interference body (25) arranged slidably in contact with a filler pipe (11) opening into the operating liquid container (10), wherein the interference body (25) is actuated electrically and/or electromagnetically between an open position and an interference position;

the interference body (25) in the open position does not reduce an internal width of the filler pipe (11) by not protruding into the filler pipe (11); and the interference body (25) in the interference position protrudes into the filler pipe (11) and reduces the internal width of the filler pipe (11).

10. The operating liquid container system as claimed in claim 6, wherein the at least one actuator (23) is configured as a shut-off valve (23) arranged between the operating liquid container (10) and an activated carbon filter (40), wherein the shut-off valve (23) is actuated electrically and/or electromagnetically between an open position and a closed position;

the operating liquid container (10) is fluidically connected to the activated carbon filter (40) by means of the shut-off valve (23) in the open position; and the operating liquid container (10) is fluidically separated from the activated carbon filter (40) by means of the shut-off valve (23) in the closed position.

11. The operating liquid container system as claimed in claim 6, wherein the at least one actuator (24) is configured as an electromagnet (24) situated inside a filler neck (12) of a filler pipe (11) opening into the operating liquid container (10), wherein the electromagnet (24) is actuated between an active state and a passive state;

the electromagnet (24) in the active state produces a magnetic field to control the closure or opening of a delivery valve (91) inserted in the filler pipe (11); and the electromagnet (24) in the passive state does not produce a magnetic field.

12. The operating liquid container system as claimed in claim 2, wherein the fill control device (60) has a signal transmitter unit (61) for wireless transmission of signals to a filler apparatus (90, 92).

13. The operating liquid container system as claimed in claim 2, wherein the fill control device (60) is configured to determine, before a filling process, the concentration of a quality property and the quantity of operating liquid present in the operating liquid container (10);

the fill control device (60) is furthermore configured to determine, after a filling process, the concentration of a quality property and the quantity of operating liquid present in the operating liquid container (10); and the fill control device (60) is configured to calculate the concentration of a quality property of the introduced operating liquid by forming the quotient of the product of the concentration of the quality property before the filling process, with the operating liquid quantity before the filling process, with the operating liquid quantity after the filling process.

* * * * *